United States Patent [19]

Williams et al.

[11] Patent Number: 4,640,826

[45] Date of Patent: Feb. 3, 1987

[54] METHOD OF MAKING YTTRIUM SILICON OXY COMPOUND

[75] Inventors: Robert M. Williams, Livonia; Elaine C. Beckwith, Riverview, both of Mich.

[73] Assignee: Ford Motor Company, Dearborn, Mich.

[21] Appl. No.: 813,168

[22] Filed: Dec. 24, 1985

[51] Int. Cl.$^4$ .............................................. C01F 17/00
[52] U.S. Cl. .................................... 423/263; 423/326
[58] Field of Search ................................ 423/263, 326

[56] References Cited

U.S. PATENT DOCUMENTS 2,640,756 6/1953 Wills ..................................... 423/263
4,401,617 8/1983 Ezis et al. ............................. 501/87

OTHER PUBLICATIONS

Wanklyn et al, "J. of Materials Science", vol. 9, #12, 1974, pp. 2007-2014.

*Primary Examiner*—H. T. Carter
*Attorney, Agent, or Firm*—Joseph W. Malleck; Leonard Tachner

[57] ABSTRACT

A method is disclosed of making yttrium silicon oxy compounds, comprising: (a) mixing powdered hydrated metal nitrate with silica in molar equivalent amounts to yield upon heating a desired duo metal oxy compound; (b) agitatingly heating said mixture to melt and decomposition temperatures for the nitrate (e.g., 340°-370° C.), the melt encapsulating the silica particles; and (c) heating the sludge to a temperature (1300°-1550° C.) for a period of time (2-5 hours) effective to stimulate chemical reaction between the decomposed nitrate and silica to form yttrium silicon oxide.

10 Claims, No Drawings

METHOD OF MAKING YTTRIUM SILICON OXY COMPOUND

BACKGROUND OF THE INVENTION

1. Technical Field

This invention relates to the art of making oxygen compounds and, more particularly, to the making of duo metal oxy compounds.

2. Description of the Prior Art

Yttrium silicon oxy compounds have heretofore been made as second phase compounds comingled with other second phase oxynitride compounds, all formed as a result of making hot pressed silicon nitride with yttrium oxide and silica aids (see U.S. Pat. No. 4,401,617, particular column 8, lines 37–53). Such formation of yttrium silicon oxy compounds from $Y_2O_3$ and $SiO_2$ is undesirable because a pure or homogeneous oxy compound does not result. The formation takes place as a chemical reaction of the solid ingredients limited by inadequate intimacy between all ingredients; the chemical reaction must proceed from surface diffusion contact between particles and is inherently limited.

It would be desirable if $Y_2O_3$ and $SiO_2$ were to be melted because such melt would insure intimacy so necessary to a uniform homogeneous reaction product. Unfortunately, each of these ingredients melt at temperatures that exceed 1700° C. and such temperatures are extremely uneconomical to use in making basic starting materials and certainly such temperatures are difficult to consistently reach and maintain in hot pressing or sintering techniques in powder metallurgy.

What is needed is a method by which low cost ingredients may be used to form duo metal oxy compounds, such as yttrium silicon oxide, at reactive temperatures below 1550° C.

It is an object of this invention to make a duo metal oxy compound utilizing low cost ingredients, such as yttrium silicon oxide, at reactive temperatures below 1550° C.

SUMMARY OF THE INVENTION

The invention is a method of making yttrium silicon oxy compounds, comprising: (a) mixing powdered hydrated metal nitrate with silica in molar equivalent amounts to yield upon heating a desired duo metal oxy compound; (b) agitatingly heating said mixture to melt and decomposition temperatures for the nitrate, the melt encapsulating the silica particles; and (c) heating the sludge to a temperature for a period of time effective to stimulate chemical reaction between the decomposed nitrate and silica to form yttrium silicon oxide.

Preferably, the heating of step (b) is carried out at a temperature in the range of 340°–370° C. to melt and decompose hydrated yttrium nitrate, and optimally at about 350° C., to melt the nitrate in a manner to drive off water vapor and mixed nitrogen oxides (such as $H_dN_eO_f$ where d is 0–1, e is 1–2, and f is 1, 2 or 4) and to decompose the compound to essentially $YN_aO_b$ where a is 1–2 and b is 1, 2 or 4, said melted residue forming a viscous sludge concentration with the silica.

Preferably, the heating for chemical reaction is carried out at a temperature above 1300° C. but below 1550° C. Advantageously, the elevated heating is carried out for a period of time of 2–5 hours and is carried out at generally inert conditions just above atmospheric pressure in a closed container (e.g., 1.04–1.1 atmospheres).

Preferably, the starting ingredients have purities of at least 99.99% for each of the nitrate and for the silica.

The first heating is to the decomposition temperature of the nitrate in order to drive off water vapor and mixed nitrogen-oxygen gases.

DETAILED DESCRIPTION AND BEST MODE

To make a desired duo metal oxy compound at reactive temperatures at or below 1550° C. and with low cost ingredients, the following method was devised.

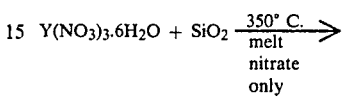

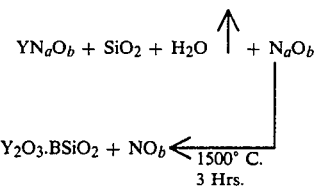

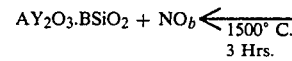

a = 1–2
b = 1, 2 or 4
A = 1
B = 1–2

The above equation represents the following three steps: (a) mixing powdered hydrated metal nitrate, such as hydrated yttrium nitrate, with silica in molar equivalent amounts to yield upon reactive heating a desired duo metal oxy compound; (b) agitatingly heating the mixture to at least substantially the melt and decomposition temperature of the nitrate; and (c) heating the mixture resulting from step (b) to a temperature and for a period of time at which the silica and decomposed nitrate chemically react.

Forming Mix

The hydrated metal nitrate selected is preferably $Y(NO_3)_3 \cdot 6H_2O$ but can be alternatively trihydrate or tetrahydrate; the nitrate can also be cerium hexa or trihydrate. The purity for such starting metal nitrate is at least 99.99%. The selected silica must have a purity of at least 99.99% which is readily available in commercial quantities. The starting particle sizes for each of said ingredients is typically in the range of less than 200 microns for the metal nitrate and less than 10 microns for silica. In forming the mix, predetermined molecular equivalent amounts of each of said ingredients are measured so that upon reactive heating a desired duo metal oxy compound will be formed completely from said measured amounts of ingredients. To illustrate, to form the oxy compound of $Y_2Si_2O_7$, the molar equivalent amounts for said nitrate and $SiO_2$ would be in a ratio of 1:1 and comprise 86.4 weight percent $Y(NO_3)_3 \cdot 6H_2O$ and 13.6 weight percent $SiO_2$. To form the oxy compound of $Y_2SiO_5$, the molar equivalent amounts of the nitrate and $SiO_2$ should be in a ratio of 2:1. This translates into 92.7 weight percent $Y(NO_3)_3 \cdot 6H_2O$ and 7.3 weight percent $SiO_2$.

Heating to Decompose Nitrate

The ingredients are blended together and crushed and ground in suitable apparatus to provide a homogeneous blended mixture. Typical apparatus for carrying out this kind of blending and mixing on a commercial scale can be an inert ball mill with inert grinding media, or on a laboratory basis, an agate mortar and pestle may be employed. The mixture is heated to a temperature to melt and decompose the nitrate and so that the melt will encapsulate the silica particles to form a sludge. The temperature to carry out this decomposition is in the range of 340°-370° C. when utilizing hydrated yttrium nitrate and is preferably about 350° C. Such heating is carried out for a period of 50-75 minutes and can be carried out in a furnace apparatus which consists of high purity mullite or can be carried out on a laboratory basis such as using a hot plate and agate stirrer. It is important that the nitrate be melted so as to wet the silica particles in a uniform manner and encapsulate them. The decomposition temperature will vary depending upon the chemical ingredient of the nitrate. For example, cerium hexahydrate can be decomposed at 200°-275° C.

Heating to Chemically React

The sludge resulting from the heating of the above step is then heated to a temperature effective to stimulate chemical reaction between the decomposed nitrate and the silica to form a metal silicon oxide such as yttrium silicon oxide. The heating is carried out in an inert atmosphere in a suitable furnace, just above atmospheric pressure, such as obtainable in a tube furnace. The sludge mixture can be placed in an inert type of container such as high purity mullite. The temperature to which the sludge is heated is in the range of 1400°-1550° C. and preferably about 1500° C. when employing yttrium nitrate. The range of reactive temperatures will depend upon the duo metal oxy compound desired, but it is important that the temperature and the time period for carrying out such reaction be selected so as to insure at least 90% chemical reactivity. The time period is typically in the range of 2-5 hours.

Resultant Compound

Examination of the resultant powder from the above three steps will show the powder to have a highly pure condition exhibited by the X-ray diffraction pattern, the ultrapure white color of the powder and trace metal, sulfur and carbon analysis. The average particle size is typically less than two microns. The resultant compound is useful for heat engines and cutting tools.

EXAMPLES

To demonstrate the general limits of the invention, a series of samples were prepared and examined, as set forth in Table 1. Each of the samples were prepared in accordance with the procedure whereby the chemical ingredients were weight measured and mixed together in a uniform blended manner with the purity of the starting ingredients identified. The blended mixture was then heated in a first stage to a general decomposition temperature range and the ability of the nitrate to wet the silica was then examined. Finally, the material resulting from the first heating stage was subjected to a second heating stage to a higher temperature for chemical reaction. The temperature and time was documented. The resultant compound from these samples was then examined as to color, particle size, and compound chemistry determined by X-ray diffraction.

Sample 1 is representative of the preferred invention herein and the resulting product showed greater than 90% $Y_2SiO_5$; sample 2 employed a decomposition heating temperature which was substantially below that preferred, and the resultant powder showed free yttria remaining in excess of 20%. In sample 3, ingredients were deviated from molar equivalent amounts necessary to form a specific oxy compound; the resultant material showed free yttria in excess of 20%. Sample 4 employed a hydrated nitrate which was a metal other than yttrium and the resultant product contained greater than 90% $Ce_2Si_2O_7$. Samples 5 and 6 explored using different reactivity temperature levels and the differences in the resultant powder was noted; sample 5 product contained in excess of 20% $SiO_2$ and $Y_2O_3$ and sample 6 product contained in excess of 20% $Y_2O_3$.

While particular embodiments of the invention have been illustrated and described, it will be obvious to those skilled in the art that various changes and modifications may be made without departing from the invention, and it is intended to show in the appended claims all such changes and modifications which fall within the true spirit and scope of the invention.

TABLE I

| | Mix | | | Decomposition Heating | | | Heating to Chemically React | | | Resultant Compound | | |
|---|---|---|---|---|---|---|---|---|---|---|---|---|
| Sample | Chemicals | Amounts (Grams) | Purity (%) | Temp. (°C.) | Time (min.) | Wetting | Temp. (°C.) | Time (Hrs.) | Atmosphere | Color | Particle Size | Compound Chemistry |
| 1 | $Y(NO_3)_3.6H_2O$ / $SiO_2$ | 4.63 / 0.37 | 99.99 / 99.99 | 350 | 60 | Yes | 1500 | 4 | Argon Over-pressure | White | PSD~2 μ | $Y_2O_3.SiO_2$ ($Y_2SiO_5$) |
| 2 | $Y(NO_3)_3.6H_2O$ / $SiO_2$ | 4.63 / 0.37 | 99.99 / 99.99 | 90 | 60 | No | 1500 | 4 | Argon Over-pressure | Off-White | — | Free $Y_2O_3$ Additionally Remaining |
| 3 | $Y(NO_3)_3.6H_2O$ / $SiO_2$ | 7.43 / 0.37 | 99.99 / 99.99 | 90 | 60 | No | 1500 | 4 | Argon Over-pressure | — | — | Free $Y_2O_3$ Additionally Remaining |
| 4 | $Ce(NO_3)_3.6H_2O$ / $SiO_2$ | 4.39 / 0.61 | 99.99 / 99.99 | 250 | 60 | No | 1500 | 4 | Argon Over-pressure | White | PSD~3 μ | $Ce_2Si_2O_7$ |
| 5 | $Y(NO_3)_3.6H_2O$ / $SiO_2$ | 4.32 / 0.68 | 99.99 / 99.99 | 350 | 60 | No | 1200 | 1 | Argon Over-pressure | Off-White | — | Free $SiO_2$ and Free $Y_2O_3$ Remaining |

TABLE I-continued

| | Mix | | | Decomposition Heating | | | Heating to Chemically React | | | Resultant Compound | | |
|---|---|---|---|---|---|---|---|---|---|---|---|---|
| Sample | Chemicals | Amounts (Grams) | Purity (%) | Temp. (°C.) | Time (min.) | Wetting | Temp. (°C.) | Time (Hrs.) | Atmosphere | Color | Particle Size | Compound Chemistry |
| 6 | $Y(NO_3)_3 \cdot 6H_2O$ / $SiO_2$ | 4.32 / 0.68 | 99.99 / 99.99 | 350 | 60 | No | 1800 | 1 | Argon Overpressure | — | — | Free $Y_2O_3$ Remaining |

We claim:

1. A method of making a duo metal oxy compound, comprising:
    (a) mixing a powdered hydrated nitrate of a metal selected from the group consisting of cerium and yttrium with silica in molar equivalent amounts to yield, upon heating, a dual oxide compound of silicon and said metal;
    (b) agitatingly heating said mixture to the melt and the decomposition temperature of the nitrate; and
    (c) heating said mixture resulting from step (b) to a temperature from 1300° to 1550° C. and for a period of time from 2 to 5 hours, and sufficient for the silica and decomposed metal nitrate to chemically react and form a dual oxide compound of silicon and said metal.

2. The method as in claim 1, in which said metal nitrate is yttrium nitrate.

3. The method as in claim 2, in which said molar equivalent amounts for said nitrate and $SiO_2$ are in a ratio of 2:1 in order to form $Y_2SiO_5$.

4. The method as in claim 2, in which the molar equivalent amounts for said nitrate and silica are in a ratio of 1:1 to form $Y_2Si_2O_7$.

5. The method as in claim 2, in which said heating of step (b) is carried out to the temperature range of 340°–370° C. for a period of 50–75 minutes in order to drive off water vapor and mixed nitrogen oxides from said nitrate thereby decomposing said nitrate and leaving a melted residue.

6. The method as in claim 5, in which said decomposed nitrate is $YN_aO_b$ where a is 1–2 and b is 1, 2 or 4.

7. The method as in claim 1, in which the powder mixture is intimately mixed.

8. The method as in claim 1, in which said hydrated metal nitrate is selected from the group consisting of tri, tetra and hexahydrated yttrium nitrate, and tri and hexahydrated cerium nitrate.

9. The method as in claim 1, in which the heating in step (c) is under inert conditions and at a pressure just above atmospheric pressure.

10. The method as in claim 1, in which the reaction of step (c) is complete essentially to 90%.

* * * * *